H. A. BERKMAN.
CARBURETER ADJUSTER.
APPLICATION FILED JAN. 3, 1921.
1,368,474.
Patented Feb. 15, 1921.
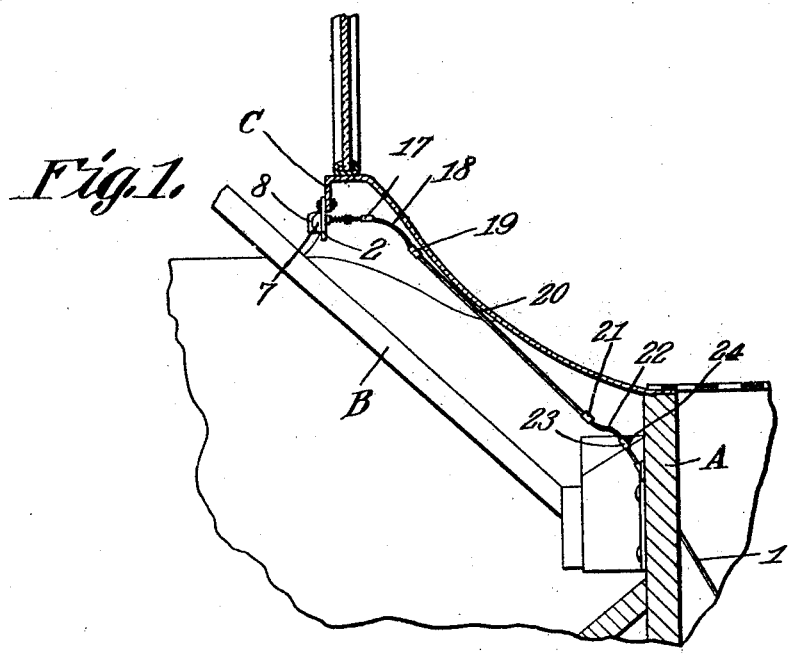
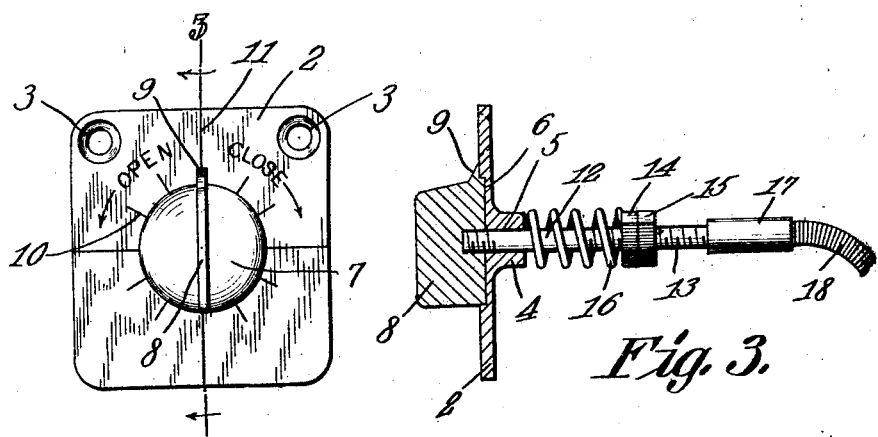
Fig. 2.
Fig. 3.
Inventor
H. A. Berkman,
By C. A. Snow & Co.
Attorneys

UNITED STATES PATENT OFFICE.

HERBERT A. BERKMAN, OF CHICAGO, ILLINOIS.

CARBURETER-ADJUSTER.

1,368,474.   Specification of Letters Patent.   Patented Feb. 15, 1921.

Application filed January 3, 1921. Serial No. 434,602.

*To all whom it may concern:*

Be it known that I, HERBERT A. BERKMAN, a citizen of the United States, residing at Chicago, in the county of Cook and State of Illinois, have invented a new and useful Carbureter-Adjuster, of which the following is a specification.

This invention relates to means whereby a carbureter can be adjusted readily from the dashboard of a motor vehicle, one of the objects of the invention being to utilize an attachment which can be installed readily on a car with or without an instrument board.

A further object is to provide an attachment which does not require the use of pivots and similar joints but has combined with it flexible shaft sections whereby the power transmitting portion of the attachment can be arranged at any angle desired without interfering with the operativeness thereof.

A still further object is to provide simple and efficient means for holding the attachment against accidental movement after adjustment and which clearly indicates to the driver the extent of adjustment.

With the foregoing and other objects in view, which will appear as the description proceeds, the invention resides in the combination and arrangement of parts and in the details of construction hereinafter described and claimed, it being understood that, within the scope of what is claimed, changes in the precise embodiment of the invention shown can be made without departing from the spirit of the invention.

In the accompanying drawings the preferred form of the invention has been shown.

In said drawings

Figure 1 is a section through a portion of a motor vehicle and showing the attachment in side elevation.

Fig. 2 is a front elevation of the dial and the indicator button.

Fig. 3 is a section on line 3—3, Fig. 2.

Referring to the figures by characters of reference 1 designates the usual rod extending to the carbureter and journaled within the dash A of the motor vehicle. The steering post has been indicated at B and the operating portion of the present attachment is designed to be secured to the instrument board C or to any other part of the vehicle at a point close to the steering post where it can be reached easily by the driver. The part secured to this instrument board or the like comprises a plate 2 having fastener receiver openings 3, there being a boss 4 on one face of the plate through which extends an opening 5. A recess 6 is provided in the opposite face of the plate and concentric with the opening and mounted snugly within this recess is one face of a disk 7. A finger piece 8 projects from the disk and has a pointer 9 projecting from one end thereof, this pointer being designed to register with any one of a series of graduations 10 radiating from the recess 6. The graduations may be suitably designated as by means of the words "open" and "closed" arranged at opposite sides of a neutral or intermediate graduation 11, there being arrows combined with the words to indicate direction of movement when it is desired to open or close the adjustable portion of the carbureter.

Secured to the disk 7 so as to rotate therewith is a stem 12 extending through the opening 5 and having its free end portion screw threaded as at 14. A nut 14 and a lock nut 15 are mounted on this threaded portion and a coiled spring 16 is arranged on the stem 12 between the nut 14 and the boss 4 and it will be obvious that this spring serves to bind the disk 7 against the plate 2 so that the pointer 9 will be held by friction in any position to which it may be turned. By means of the nuts 14 and 15 the tension of the spring can be regulated.

The threaded end portion 13 of the stem 12 is soldered or otherwise secured to a sleeve 17 in which is soldered one end of a short flexible shaft section 18. The other end of this shaft section is soldered or otherwise secured within a sleeve 19 soldered or similarly fastened to one end of a rod 20. Another sleeve 21 is secured to the other end of the rod and to one end of a short flexible shaft section 22 carrying a sleeve 23 which is provided with a set screw 24. This sleeve 23 is adapted to be placed in engagement with the end of rod 1 and to be fastened thereto by the set screw. Obviously by providing the flexible shaft sections the rod 20 can be supported at any desired angle to the sleeve 23 and the stem 12 and said attachment can thus be applied readily to any type of vehicle so as to constitute efficient means for rotating the rod 1. The flexible shafts permit of the placing of the parts at sharp angles which heretofore have required the use of universal joints and other expensive connections which get out of order easily. By utilizing the spring a simple means is employed for holding the parts in adjusted positions, it being unnecesary, with the construction shown, to utilize separate friction washers or the like. With this construction of attachment there is no lost motion in the actuating of the rod 1 such as occurs where springs are employed as part of the transmission connection in lieu of flexible shafting.

What is claimed is:—

1. A carbureter adjusting attachment for motor vehicles comprising a rod, a flexible shaft section secured to each end of the rod, means for securing one of said sections to the carbureter rod, a combined indicator and actuating member connected to the other shaft section, and adjustable resilient means for holding the actuating member against free rotation.

2. A carbureter adjusting attachment for motor vehicles including a dial plate, a finger piece mounted for rotation thereon and including a pointer, a stem projecting from the finger piece and through the dial plate, resilient means adjustably mounted on the stem for binding the finger piece upon the dial plate to hold said finger piece against accidental rotation, a rod, a flexible shaft section connecting the rod to the stem, a coupling sleeve, and a flexible shaft section connecting said sleeve to the other end of the rod.

3. A carbureter adjusting attachment for motor vehicles including a dial plate having a recess, a finger piece mounted for rotation in the recess and including a pointer, a stem extending from the finger piece and through the dial plate, resilient means on the stem for binding the finger piece within the recess to hold the pointer against accidental rotation, a rod, a flexible shaft connection between one end of the rod and the stem, a flexible shaft section connected to the other end of the rod, and means for securing the flexible shaft section to the rod of a carbureter.

In testimony that I claim the foregoing as my own, I have hereto affixed by signature in the presence of two witnesses.

HERBERT A. BERKMAN.

Witnesses:
O. RASMUSON,
E. DUNHAM.